United States Patent [19]

Kieffer

[11] 4,260,040

[45] Apr. 7, 1981

[54] SAWHORSE EXTENSION TABLES

[76] Inventor: Vincent C. Kieffer, Gretna, Nebr.

[21] Appl. No.: 32,147

[22] Filed: Apr. 23, 1979

[51] Int. Cl.[3] .................................... B23Q 3/00

[52] U.S. Cl. .................................... 182/181; 182/132; 182/224; 269/296

[58] Field of Search .................................... 269/296–299, 269/321 CF; 182/130–132, 181–182, 224

[56] References Cited

U.S. PATENT DOCUMENTS

| | | | |
|---|---|---|---|
| 887,560 | 5/1908 | White | 182/182 |
| 2,132,331 | 10/1938 | Wanamaker | 182/132 |
| 2,897,013 | 7/1959 | Delp | 182/132 |
| 3,223,370 | 12/1965 | Pignon | 182/130 |

FOREIGN PATENT DOCUMENTS

| | | | |
|---|---|---|---|
| 2620000 | 11/1977 | Fed. Rep. of Germany | 269/321 CF |

*Primary Examiner*—Robert C. Watson

*Attorney, Agent, or Firm*—Zarley, McKee, Thomte, Voorhees & Sease

[57] ABSTRACT

A sawhorse having a crossbar and support legs at each end of the crossbar is provided with a workpiece support member supported on the sawhorse at a position laterally offset from the crossbar and at least as high as the crossbar. A second workpiece support member may be arranged on the opposite side of the crossbar and third and fourth workpiece support members may be provided in longitudinally spaced relation from the first and second workpiece support members respectively. The workpiece support members may have flat top surfaces disposed in a common plane situated higher than the crossbar so that a workpiece supported thereon may be cut along a line directed between the workpiece support members and either parallel to or perpendicular to the sawhorse crossbar with both cut portions of the workpiece supported on the workpiece support members.

4 Claims, 6 Drawing Figures

SAWHORSE EXTENSION TABLES

BACKGROUND OF THE INVENTION

The present invention is directed generally to an improved sawhorse and more particularly to a sawhorse adapted to support a workpiece at spaced-apart positions whereby both the cutoff and remaining portions of the workpiece may be supported after a saw cut is made through the workpiece.

Conventional sawhorses generally include a crossbar supported at each end by a pair of legs in the form of a A-frame. Some are provided with tool-carrying shelves below the crossbar but nevertheless, the crossbar remains as the only supporting surface of the sawhorse. The problem with conventional sawhorses is that when a workpiece is to be cut, the portion to be saved is supported on both sawhorses with the portion to be cut extending beyond one of the sawhorses. As a result, it is often necessary to have a second person support the portion being cut off or risk spoiling that portion as it splinters off.

Accordingly, it is a primary object of the invention to provide a sawhorse adapted to provide independent support for the portions of the workpiece which are to be separated by a saw cut or the like.

A further object is to provide a sawhorse wherein support for a workpiece is provided at a position laterally offset from the sawhorse crossbar.

A further object is to provide a sawhorse including a plurality of extension tables supported in a common plane in laterally and longitudinally spaced-apart relation.

A further object is to provide a sawhorse having extension tables supported with the top surfaces thereof arranged in a common plane higher than the top of the sawhorse crossbar.

Finally, an object of the invention is to provide an improved sawhorse which is economical to manufacture, simple in construction and efficient in operation.

SUMMARY OF THE INVENTION

The sawhorse of the present invention includes an elongated crossbar supported by legs in an elevated horizontal position. A first workpiece support member is supported on the sawhorse at a position laterally offset from the crossbar and at least as high as the crossbar. A second workpiece support member may be similarly disposed on the opposite side of the crossbar and third and fourth workpiece support members may be supported on the sawhorse in longitudinally spaced-apart relation from the first and second workpiece support members respectively. The workpiece support members may be provided with flat top surfaces arranged in a common plane to support a flat workpiece overlying several of them. The top surfaces of the workpiece support members are preferably positioned above the top surface of the sawhorse crossbar so that a saw cut may be made along a line which passes over the crossbar without cutting the crossbar. The brackets for supporting the workpiece support members on the crossbar are efficiently constructed to provide maximum support with minimum material.

DESCRIPTION OF THE PREFERRED EMBODIMENT

Figure 1:
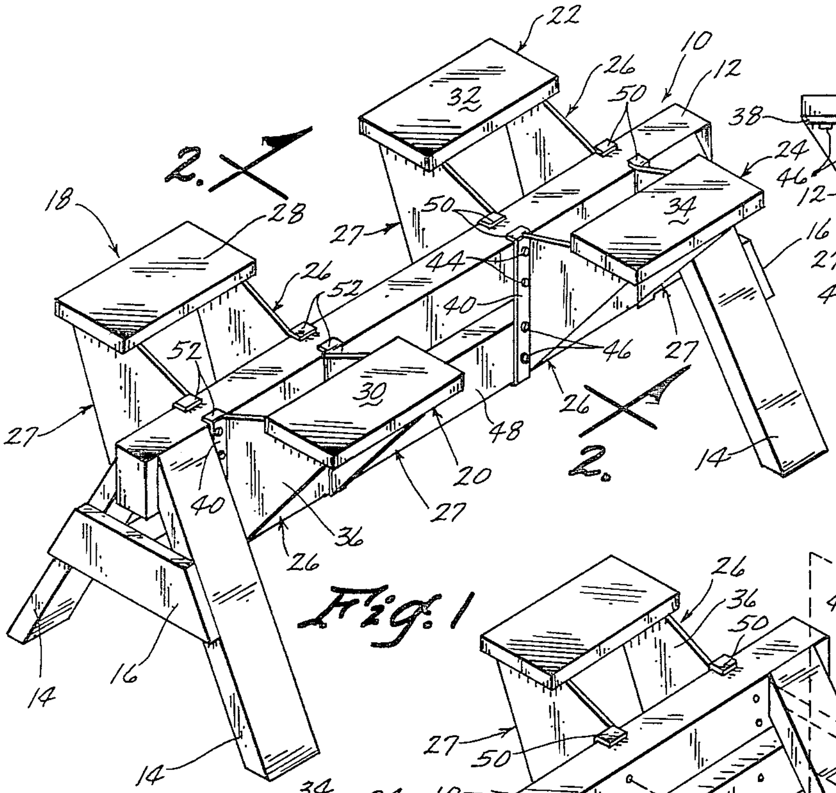
FIG. 1 is a perspective view of the sawhorse including the extension tables of the invention.

A sawhorse 10 is shown in FIG. 1 as including an elongated crossbar 12 supported at each end by a pair of legs 14 extended downwardly and laterally from the crossbar. A crossbrace 16 is connected to and extended between the legs of each pair for added support. The sawhorse thus far described is of conventional construction.

The present invention is directed to the provision of first, second, third and fourth workpiece support members 18, 20, 22 and 24 respectively which are hereinafter referred to as extension tables. Since each of the extension tables and the supporting brackets therefor are identical, only the third extension table 24 will be described in detail with like reference numerals referring to like parts of each.

Figure 2:
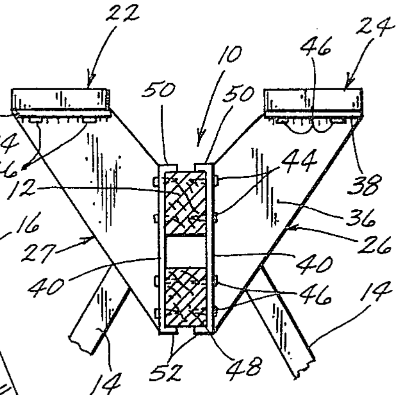
FIG. 2 is a partial side sectional view taken along line 2—2 in FIG. 1.
Figure 3:
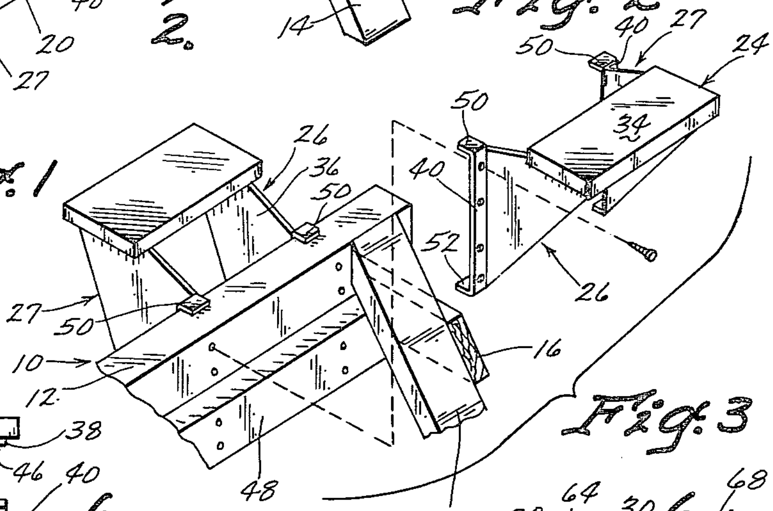
FIG. 3 is a partial blown-up perspective view of one end of the sawhorse.
Figure 4:
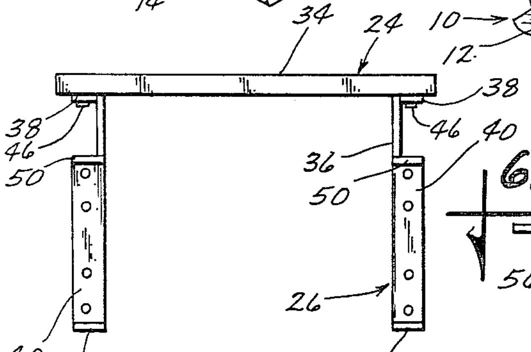
FIG. 4 is a side view of one extension table and the support brackets therefor.

Table 24 is supported in laterally spaced relation from crossbar 12 by a pair of brackets 26 and 27. The brackets are identical except that each is constructed as the mirror image of the other. It can be seen in FIG. 2 that brackets 26 and 27 are connected to the crossbar 12 and extend upwardly and laterally therefrom for supporting table 24 above the height of crossbar 12. Tables 18, 20, 22 and 24 may be provided as wooden boards having respective flat top surfaces 28, 30, 32 and 34.

Bracket 26 may be constructed from flat sheet metal, molded plastic or any other suitable material. It includes an upright plate 36 having horizontal and vertical flanges 38 and 40 directed generally perpendicular to plate 36 and to one another. Horizontal flange 38 is connected to the underside of table 24 by wood screws 42 and vertical flange 40 is connected to one side of crossbar 12 by a pair of wood screws 44. For additional support, the vertical flanges 40 are also fastened by wood screws 46 to a lower crossbar 48 which is extended between and connected to the crossbraces 16.

To facilitate assembly of the extension tables onto the sawhorse 10, the vertical flanges 40 of brackets 26 and 27 are provided with laterally inwardly directed upper and lower lips 50 and 52. Brackets 26 and 27 are first secured to the upper crossbar 12. The engagement of the upper lips 50 with the top surface of crossbar 12 assures that the brackets are aligned in a common plane. Next the lower crossbar 48 is rested on the lower lips 52 afterwhich crossbraces 16 are secured both to the sawhorse legs 14 and lower crossbar 48. Finally, extension tables 18, 20, 22 and 24 are secured onto the respective brackets by the wood screws 42.

Figure 5:
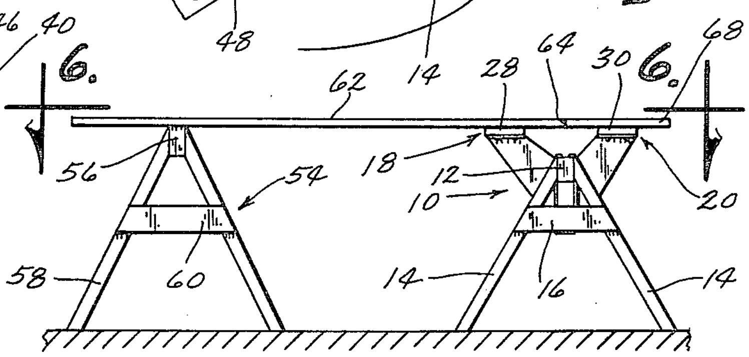
FIG. 5 is a side view of a workpiece supported on the sawhorse of the invention and a conventional sawhorse.
Figure 6:
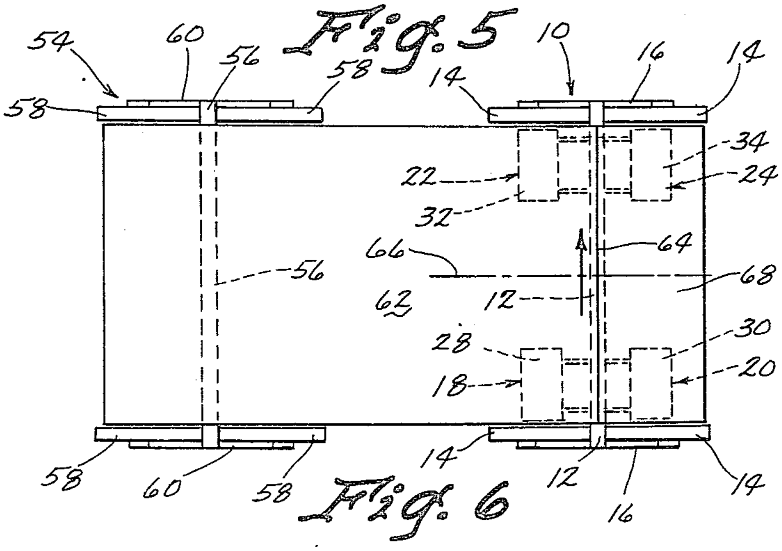
FIG. 6 is a top view taken along line 6—6 in FIG. 5.

In operation, the sawhorse equipped with the extension tables of the invention is used in combination with a conventional sawhorse 54 having a crossbar 56, legs 58 and a crossbrace 60; Sawhorse 54 is constructed so that the top of crossbar 56 is disposed at the same height as the top surfaces of the extension tables 18–24. Accordingly, an elongated flat workpiece 62, such as a 4x8 plywood panel for example, may be supported on the sawhorses 10 and 54 as shown in FIGS. 5 and 6. Because the first and third tables 18 and 22 are laterally spaced from the second and fourth tables 20 and 24, a saw cut may be made along a line 64 situated between the respective tables and generally parallel to crossbar 12. Likewise, a saw cut could be made along dotted line 66 in FIG. 6 or any other line extended in non-intersecting relation between the tables 18–24.

Note that as a cut is made along line 64, the cut-off portion 68 of the workpiece 62 remains fully supported on the second and fourth extension tables 20 and 24 so as not to fall off and splinter as it would if it were not independently supported. As a result, clean professional cuts can be made by a carpenter working alone.

When not in use, the sawhorses 10 and 54 can be stacked and stored in practically the same amount of space as a pair of conventional sawhorses 54. Because the extension tables 18–24 are supported in longitudinally spaced relation from the sawhorse legs 14 as shown in FIG. 6, the conventional sawhorse 54 can be stacked onto sawhorse 10 without obstruction.

Thus there has been shown and described an improved sawhorse which accomplishes at least all of the stated objects.

I claim:

1. In combination, a sawhorse comprising an elongated crossbar and leg means connected to said crossbar for supporting said crossbar in an elevated generally horizontal position, said leg means comprising a pair of legs connected to each end of said crossbar and extended downwardly and laterally therefrom, and further comprising a cross brace connected to and extended between the legs of each pair at a position below said crossbar and a lower crossbar connected to and extended between said cross braces, a first workpiece support member, and first support means for supporting said first workpiece support member on said sawhorse at a position laterally offset from said crossbar and at least as high as said crossbar, said first support means comprising a bracket connected to said crossbar and extended upwardly and laterally therefrom, said bracket comprising an upright plate having horizontal and vertical flanges directed generally perpendicularly to said plate and to one another, said horizontal flange being connected to said first workpiece support member and said vertical flange being connected to said crossbar.

2. The combination of claim 1, wherein the vertical flange of said bracket includes upper and lower lips extended laterally therefrom for engagement with the topside of said crossbar and the underside of said lower crossbar respectively to vertically fix said bracket relative to said crossbars.

3. In combination, a sawhorse comprising an elongated crossbar and leg means connected to said crossbar for supporting said crossbar in an elevated generally horizontal position, said leg means including a pair of legs extended downwardly and laterally from the crossbar adjacent each end thereof, a first workpiece support member, and first support means for supporting said first workpiece support member on said sawhorse at a position laterally offset from said crossbar and at least as high as said crossbar, said first support means comprising a bracket connected to said crossbar and extended upwardly and laterally therefrom, and said bracket comprising an upright plate having horizontal and vertical flanges directed generally perpendicular to said plate and to one another, said horizontal flange being connected to said first workpiece support member and said vertical flange being connected to said crossbar.

4. The combination of claim 3 wherein said first support means further comprises a second bracket connected to said crossbar and extended upwardly and laterally therefrom for connection to said first workpiece support member.

* * * * *